Figure 1:
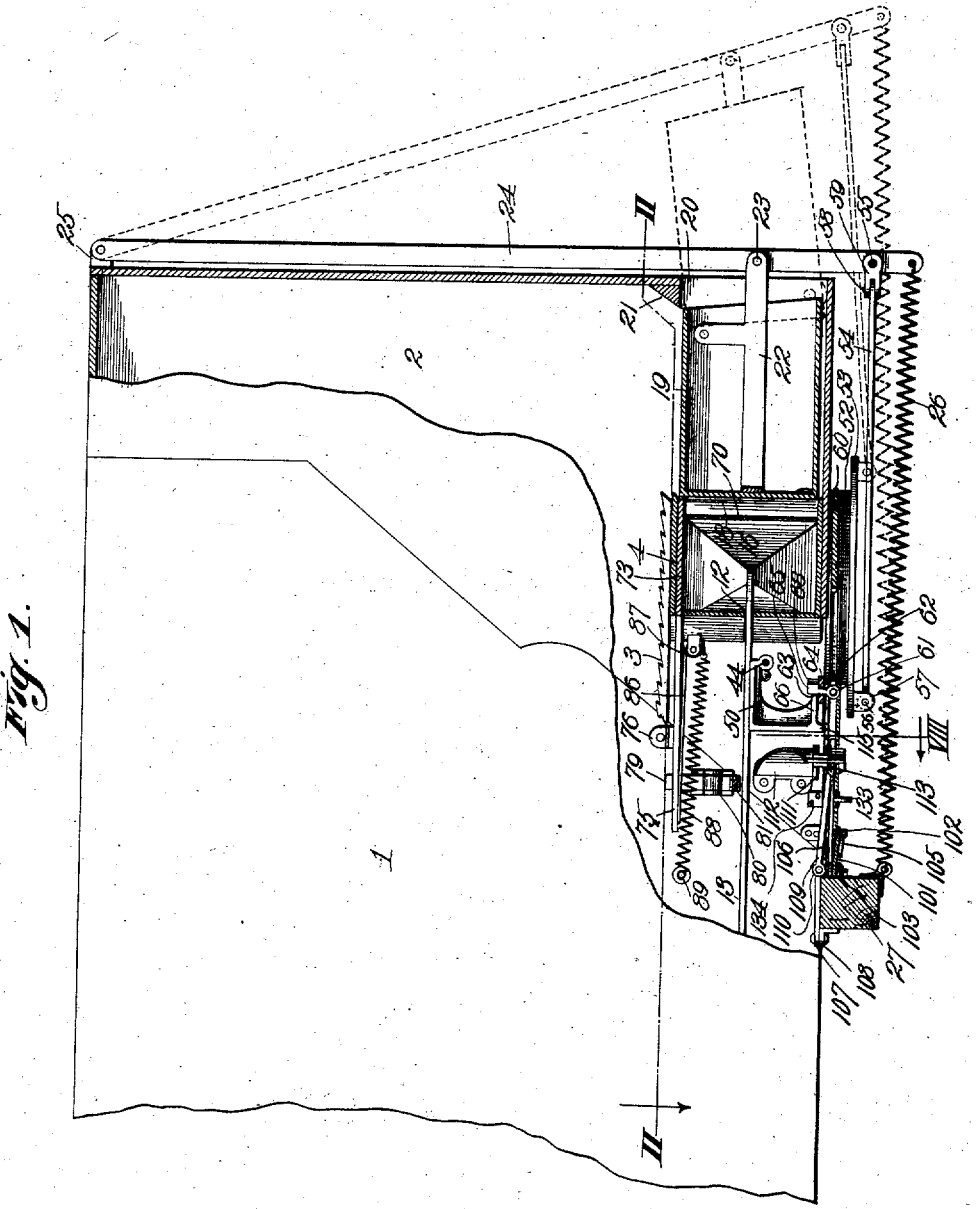

No. 853,376. PATENTED MAY 14, 1907.
R. C. REDPATH.
BALING ATTACHMENT FOR THRESHING MACHINES.
APPLICATION FILED MAY 11, 1904.

7 SHEETS—SHEET 1.

Witnesses
F. R. Glow
H. C. Rodgers

Inventor
R. C. Redpath
By George J. Thorpe
Atty.

No. 853,376. PATENTED MAY 14, 1907.
R. C. REDPATH.
BALING ATTACHMENT FOR THRESHING MACHINES.
APPLICATION FILED MAY 11, 1904.
7 SHEETS—SHEET 2.
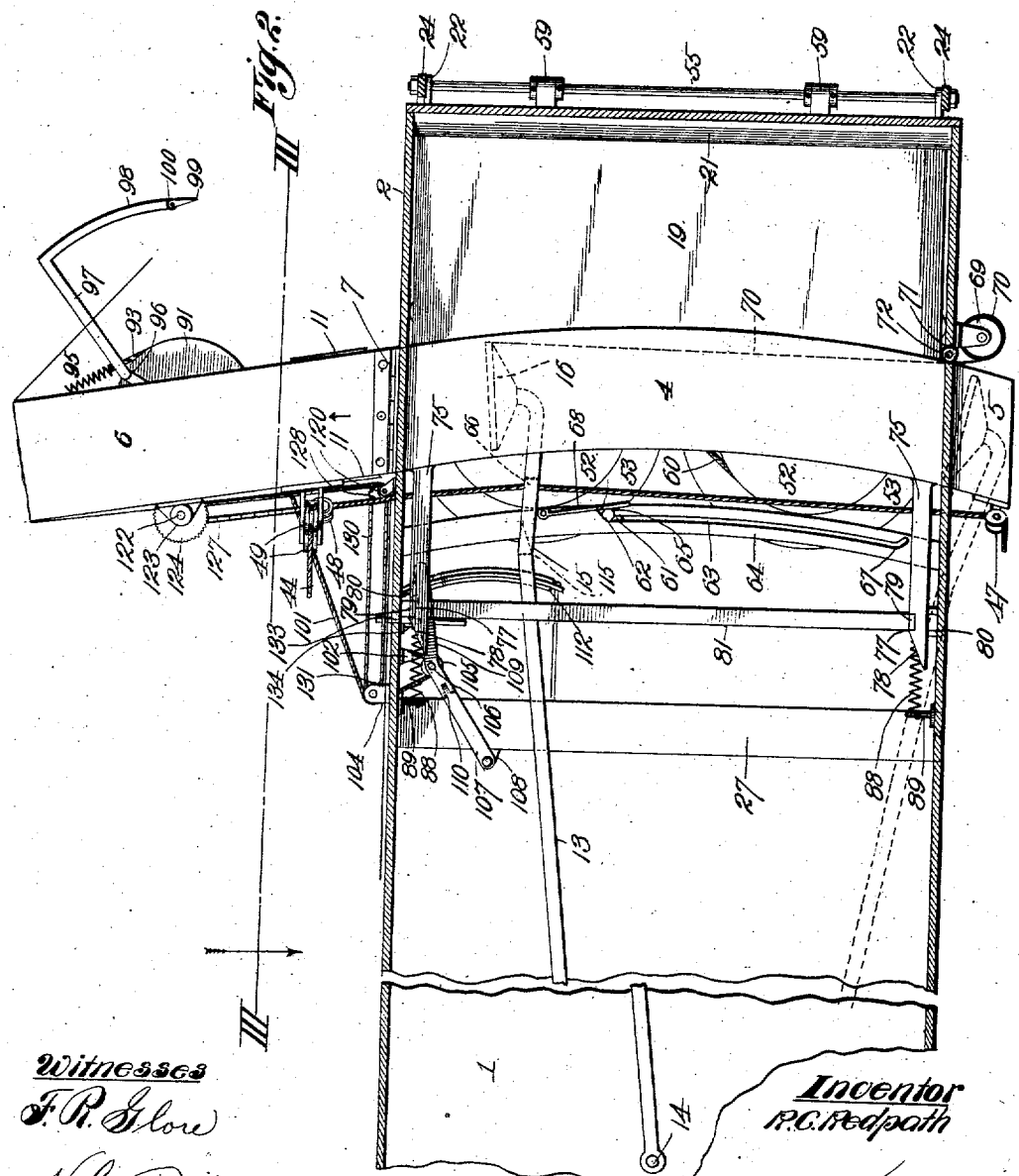
Witnesses
F. R. Glow
H. C. Rodgers
Inventor
R. C. Redpath
By George H. Thorpe
atty.

No. 853,376. PATENTED MAY 14, 1907.
R. C. REDPATH.
BALING ATTACHMENT FOR THRESHING MACHINES.
APPLICATION FILED MAY 11, 1904.
7 SHEETS—SHEET 3.
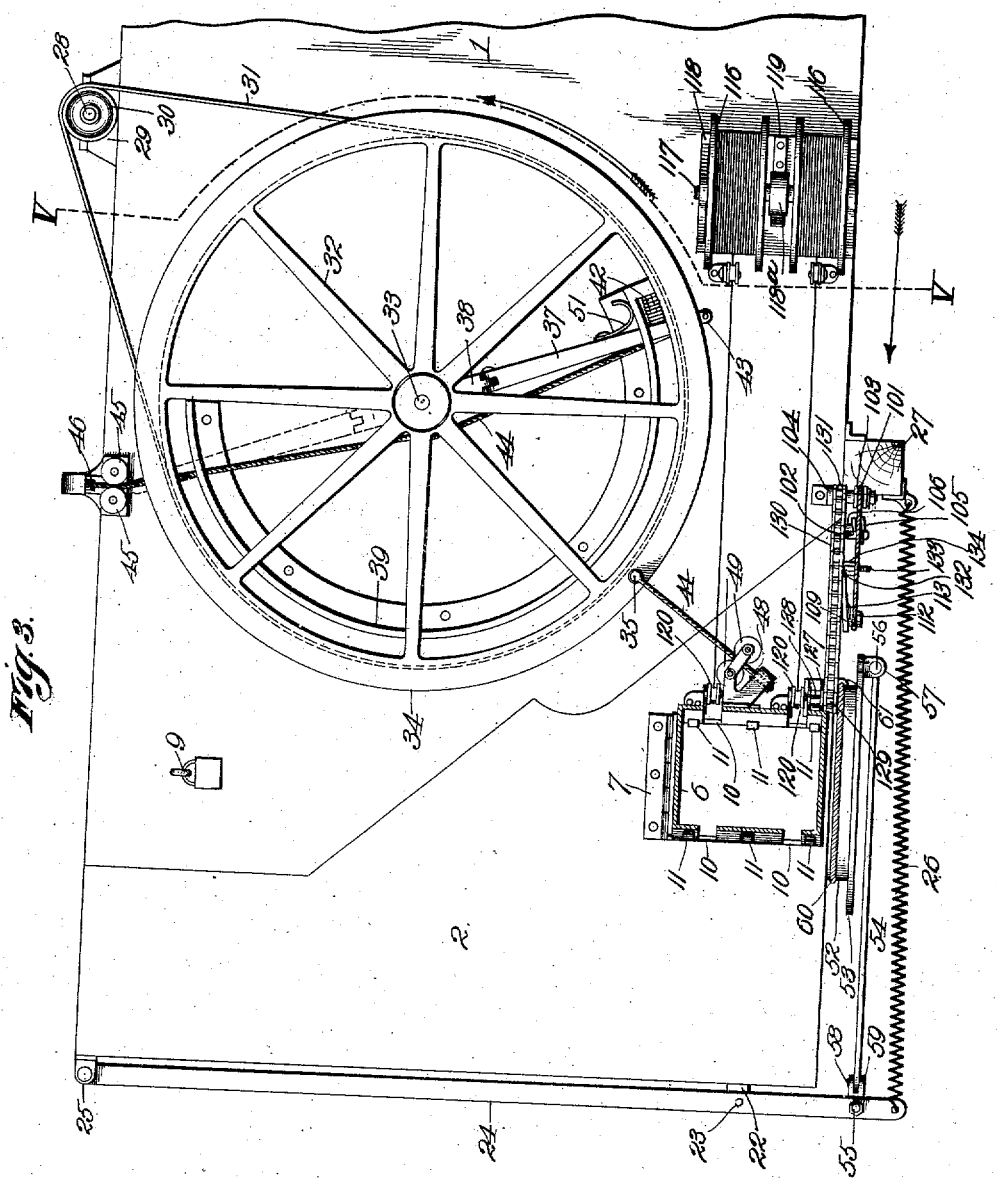
Witnesses
F. R. Glow
H. C. Rodgers
Inventor
R. C. Redpath
By George H. Thorpe
Atty.

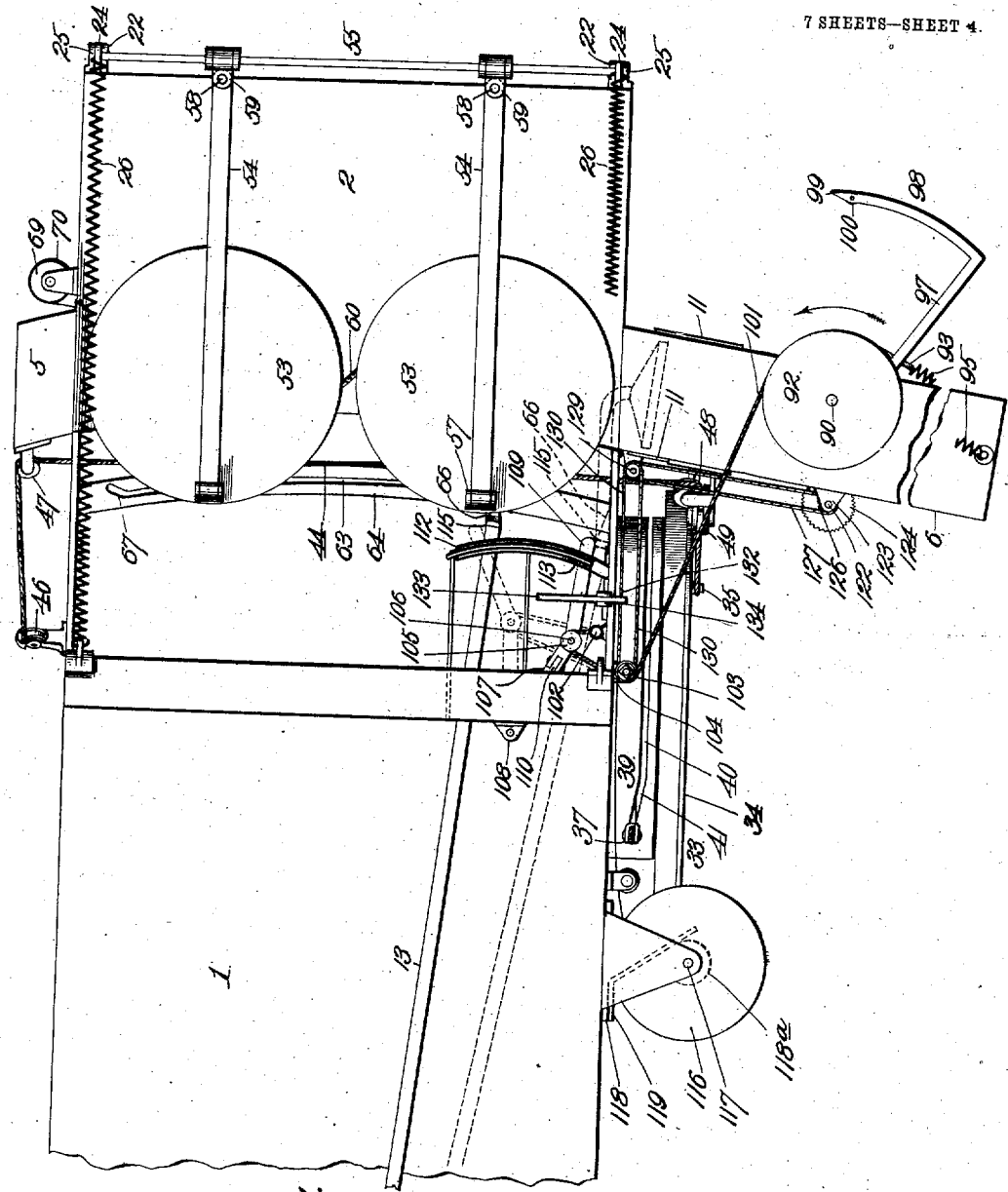

No. 853,376. PATENTED MAY 14, 1907.
R. C. REDPATH.
BALING ATTACHMENT FOR THRESHING MACHINES.
APPLICATION FILED MAY 11, 1904.
7 SHEETS—SHEET 5.
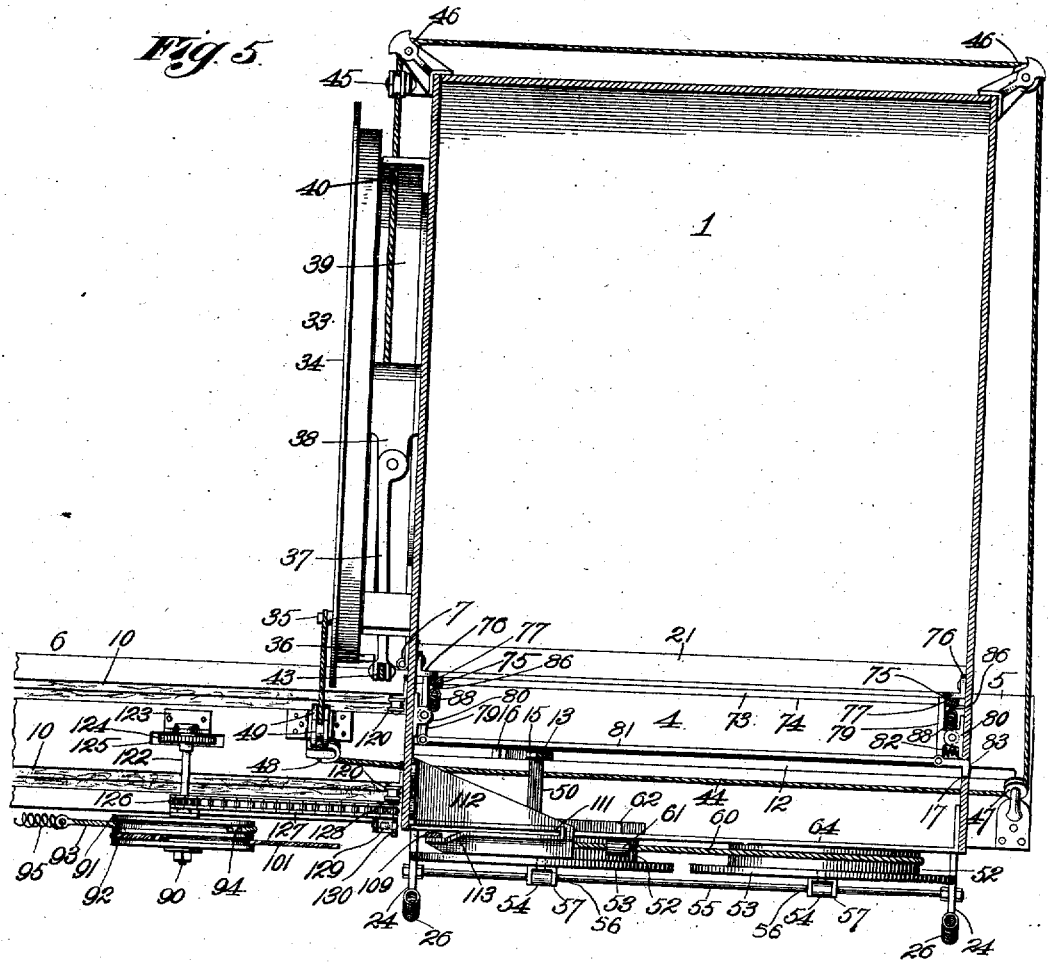
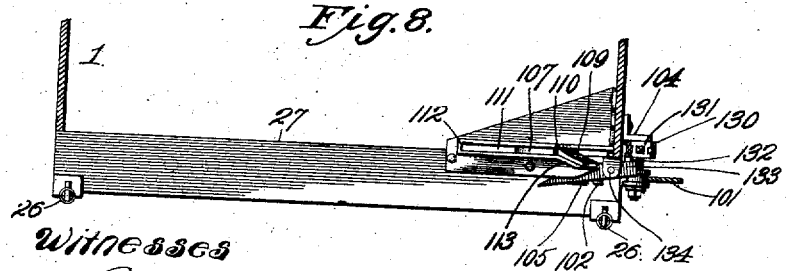

No. 853,376. PATENTED MAY 14, 1907.
R. C. REDPATH.
BALING ATTACHMENT FOR THRESHING MACHINES.
APPLICATION FILED MAY 11, 1904.
7 SHEETS—SHEET 6.
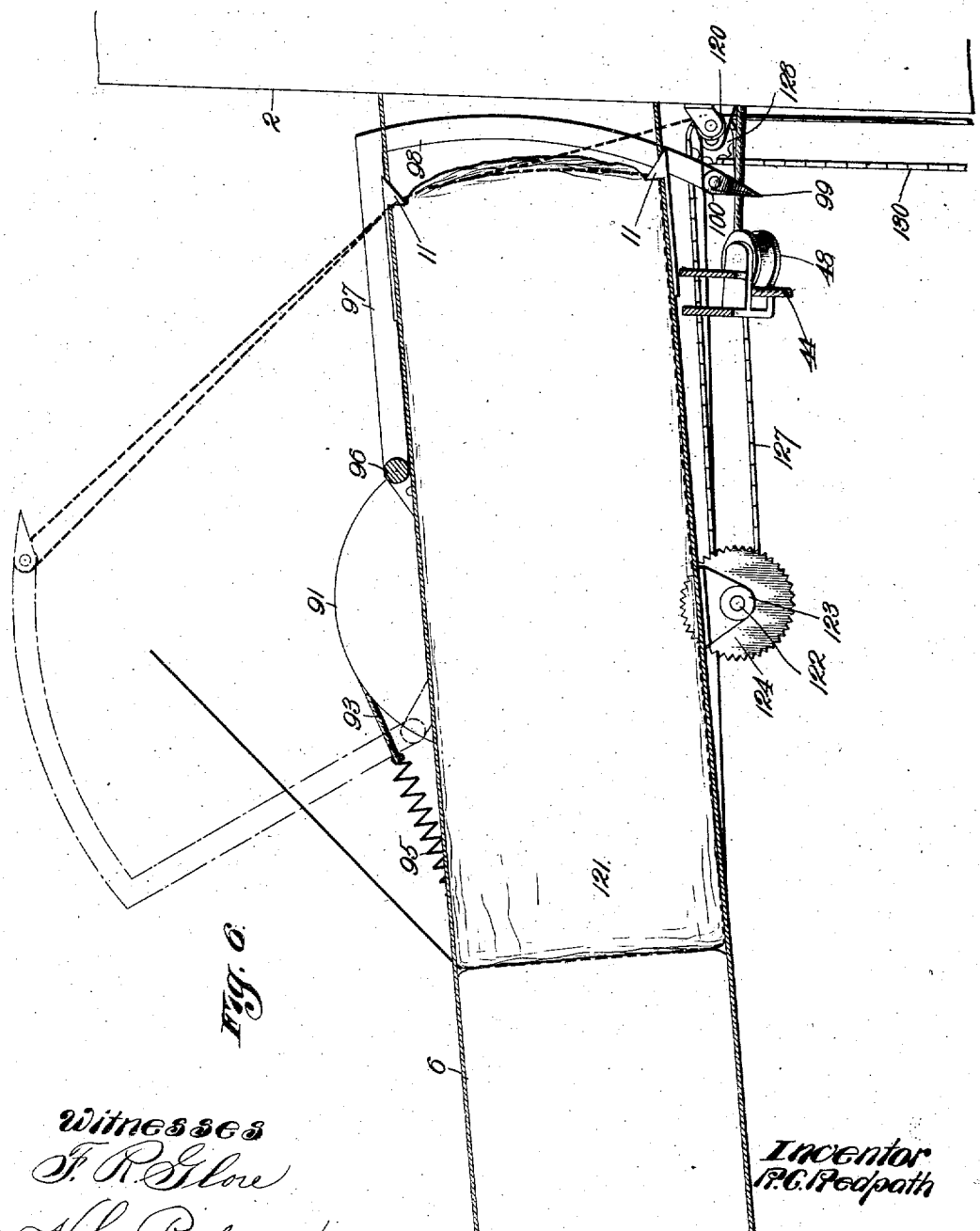
Witnesses
F. R. Glow
H. C. Rodgers
Inventor
R. C. Redpath
By George J. Thorp Atty.

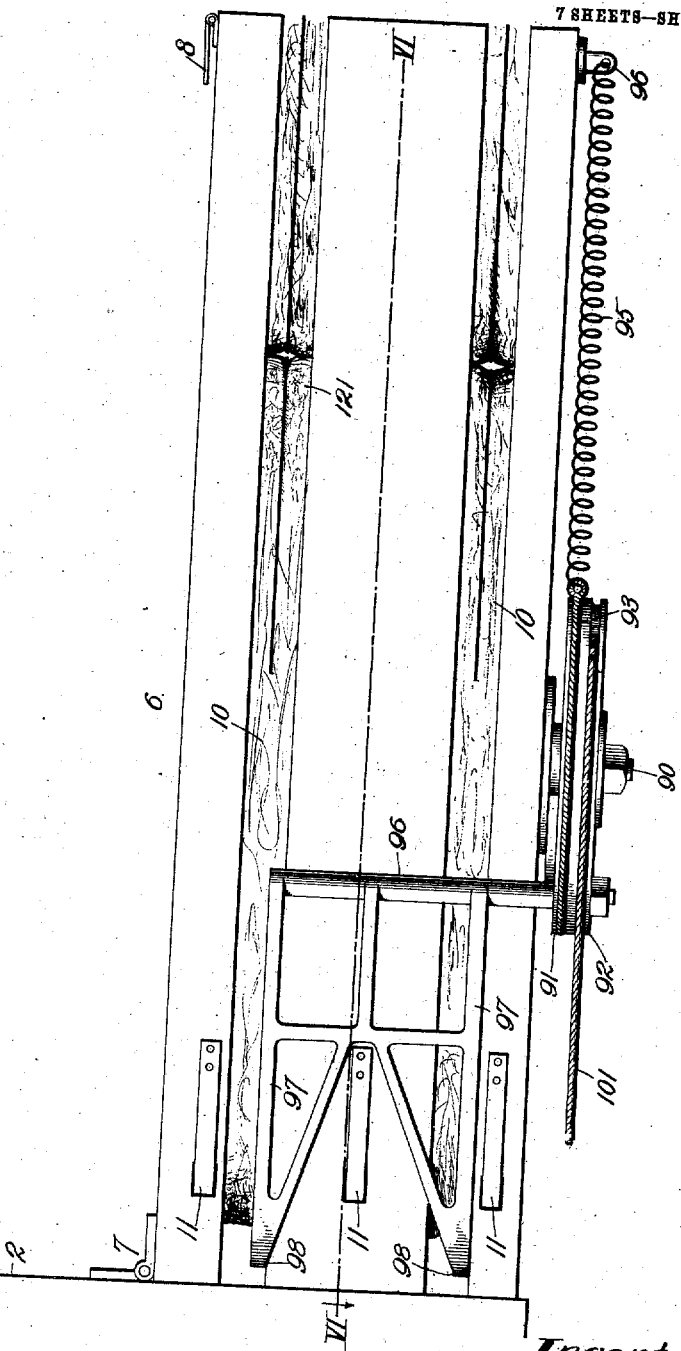

UNITED STATES PATENT OFFICE.

ROBERT C. REDPATH, OF JOHNSON COUNTY, KANSAS.

BALING ATTACHMENT FOR THRESHING-MACHINES.

No. 853,376.  Specification of Letters Patent.  Patented May 14, 1907.

Application filed May 11, 1904. Serial No. 207,487.

*To all whom it may concern:*

Be it known that I, ROBERT C. REDPATH, a citizen of the United States, residing in the county of Johnson and State of Kansas, have invented certain new and useful Improvements in Baling Attachments for Threshing-Machines, of which the following is a specification.

My invention relates to baling press attachments for threshing machines and has for its object to produce an attachment for baling the straw at the tail end of a thresher.

A further object is to produce means for automatically separating the straw into bales of predetermined length.

A still further object is to produce means for girding the bales with tie-wires and holding the wires in such position that they may be conveniently tied by hand.

With these general objects in view the invention consists in certain novel and peculiar features of construction and combinations of parts as hereinafter described and claimed; and in order that it may be fully understood reference is to be had to the accompanying drawings, in which—

Figure 1, represents one side of a threshing machine or separator, equipped with an attachment embodying my invention, said attachment being shown in central longitudinal section. Fig. 2, is a horizontal section taken on the line II—II of Fig. 1. Fig. 3, is a vertical section on the line III—III of Fig. 2. Fig. 4, is an inverted plan view with the baling case partly broken away. Fig. 5, is a vertical section taken on the line V—V of Fig. 3, but with the driving belt omitted. Fig. 6, is a sectional view of a portion of the apparatus to disclose the action of the mechanism for girding the bale with wire, taken on the line VI—VI of Fig. 7. Fig. 7, is a rear view of the apparatus shown in Fig. 6. Fig. 8, is a vertical section on the dotted line VIII of Fig. 1.

In the said drawings where like reference numerals designate corresponding parts in all the figures,—1 designates a portion of a threshing machine or separator of any suitable or preferred type, and 2 a box or casing secured rigidly to its tail end in any suitable manner and forming practically a continuation of the thresher frame, the front and lower portion of the box or casing underlying said frame in order that the rack 3 of the thresher shall project into the casing and overhang the curved and transversely extending baling case 4, which case preferably projects beyond one side of the casing as at 5, and at the opposite side is provided with an extension 6, preferably hinged as at 7, to the casing so that it may be folded up against the latter and secured in such position in any suitable manner when the apparatus is not in use, any suitable means such as a hasp 8 on the end of the baling case extension and the staple and padlock 9 secured to the thresher frame, being utilized to secure said extension in its folded position.

The extension is practically a duplicate of the compression end of an ordinary baling case, being equipped with any suitable tension, not shown, and with longitudinal slots 10, for a purpose which hereinafter appears. It is also provided with spring catches or retainers 11, which yield as the condensed straw is being forced in the direction indicated by the arrow Fig. 2, and snap behind such straw after the withdrawal of the compression plunger hereinafter described, to hold such straw in its condensed position preliminary to the girding of the bale with wire, as also hereinafter described.

The baling case 4, is provided in its front side with a horizontal slot 12, in which operates the horizontally swinging plunger arm 13, said arm extending forwardly and being pivoted as at 14, to the threshing machine frame at the point where radial lines from the curved case 4 would intersect as will be readily understood. Near its rear end said arm as shown herein is bent slightly as at 15, in order that the plunger 16 secured thereto within the case may pass into extension 6, far enough to force the condensed straw within the sphere of action of catches or retainers 11, without necessitating the slotting of the corresponding side of the casing as would be the case if the plunger arm was not bent. It is to be understood however, that the parts may be so proportioned as to avoid the necessity of bending said arm 13 and yet permit the charge of straw to be forced the required distance into the extension without slotting the side of the casing. In the proportion shown it is necessary in order to withdraw the plunger into the projecting portion 5 of the casing, to slot the proximate side of the latter as shown at 17, Fig. 5.

The baling case 4, is open at its rear side as at 18, as shown clearly in Fig. 1, so as to provide a large feed opening through which the charges of straw are forced into the case by the feed plunger 19, said plunger being preferably hollow and adapted to pass back and forth through the opening 20, in the rear wall of the box or casing, the latter at the rear margin of the opening being provided with a deflector 21, which tends to force the straw forward as it is discharged from the tail end of the thresher or separator in the usual manner, such straw as will be readily understood entering the box or casing and dropping downward therein, the rack 3 of the thresher or separator preventing any accumulation of the straw upon the baling case.

22 designates a frame secured rigidly to the feed plunger 19, and projecting rearwardly therefrom and pivotally connected as at 23 to the swinging skeleton frame 24, pivoted to brackets 25, secured to the upper portion of the box or casing, the lower ends of said swinging frame being connected by retractile springs 26, to the cross bar 27, of the thresher or separator. Said cross bar may be the axle of said machine. These springs effect the feed or forward stroke of the feed plunger. The rearward or withdrawal stroke of the feed plunger is effected through certain instrumentalities actuated by the return stroke of the baling plunger and the means for actuating the latter is as follows:—28 designates a shaft preferably driven in any suitable manner, not shown, by the mechanism which operates the threshing machine cylinder, said shaft being journaled in suitable boxings 29, secured to the top of the threshing machine, and said shaft is geared by wheel 30, and endless belt or connection 31 to the wheel 32 journaled upon stub shaft 33, also secured to said machine. Said wheel operates continuously in the direction indicated by the arrow Fig. 3, and is provided at its outer margin with a flange 34, and a wrist pin 35 projecting outward from the flange. It is also provided at its inner margin with a beveled tooth 36, adapted at times to engage and operate a jointed lever, consisting of the outer portion 37, and the inner portion 38, the latter being journaled on stub shaft 33, said portions being pivoted together to permit the outer portion to swing laterally at times.

39 is a segmental guide plate secured to the side of the thresher or separator and provided with a slot 40, of such length that its ends are diametrically opposite, the lower end of the slot being pitched as at 41, inwardly of the plane of its body portion as shown in Fig. 4, in order that lever portion 37, when engaging said pitched portion of the slot, shall be forced inwardly until eventually it is beyond the path of the tooth 36. A spring 42 in the path of the lever is compressed by the latter in its movement through portion 41 of the slot so as to be ready to start said lever on its reverse movement, at the instant its disengagement with the wheel tooth takes place. The free or outer end of said lever has a swivel connection as at 43, with a cable 44, which cable is swiveled at its opposite end to the wrist pin 35. Between said points of attachment it extends between guide rollers 45, then across the top of the thresher and the guide rollers 46 carried thereby, then down at the opposite side of the machine and under guide roller 47 supported from the box or casing as shown or in any other suitable manner, then transversely through the box or casing forward of the baling case, around guide pulley 48, between guide rollers 49. Between guide roller 47 and guide roller 48, the cable is rigidly attached to the plunger arm, preferably to the bracket 50 depending rigidly therefrom.

When the wheel and lever occupy the positions shown in Fig. 3, it will be seen that the wrist pin 35 is in the same plane as the guide roller 48, and the axis of the wheel, and that in consequence the baling plunger will be disposed in the position shown by dotted lines Fig. 2.

From the foregoing it will be understood that when the parts mentioned occupy the position shown in Fig. 3, the lever is free to reverse its movement, which it does at the instant the wrist pin passes forward of the plane hereinbefore referred to, moving backward at a speed corresponding to the rotation of the wheel because of the connecting cable, and not at a greater speed because of the friction between the guide plate 39 and spring 51, carried by said lever. The spring 42 by assisting the lever on its return movement prevents any possibility of the latter becoming locked in the position shown, because when released, it occupies the same plane with the wheel axis and the cable where it passes between the rollers 45. As the wrist pin passes the plane mentioned and the lever swings backward at a corresponding speed as stated, the plunger is caused by the cable to make its power or compression stroke, this stroke as hereinbefore mentioned being sufficiently long to cause the plunger to advance the charge of straw beyond the catches or retainers 11, so that the latter will retain such charge. As this action takes place, the wrist pin has attained a position diametrically opposite to its original position, the lever has attained the position shown in dotted lines Fig. 3, and the tooth of the wheel has engaged the lever preparatory to moving it with and in the same direction as the wheel until it is again disengaged from said tooth as, at the time, and by the means indicated, this movement of the lever accompanied by the approach of the wrist pin toward its original position effecting the return of the plunger to the opposite end of the baling case, as will be readily understood.

In order that the movement of the baling plunger shall effect the rearward or withdrawal stroke of the feed plunger against the resistance of springs 26, the following construction is provided: 52 designates a pair of grooved wheels journaled at the bottom of the box or casing, and secured rigidly to and concentrically of said grooved wheels are disks 53 which in diameter slightly exceed the length of stroke of the feed plunger. The disks are linked by pitmans 54 with the cross bar 55 of swinging frame 24, the front ends of the pitmans being pivoted for vertical movement as at 56 to brackets 57 depending from the disks, their rear ends being pivoted for lateral movement as at 58, to brackets 59, pivoted for vertical movement on cross bar 55. By this arrangement the rise and fall of the cross bar as the frame swings back and forth and the lateral movement of brackets 57 due to the horizontal rotation of the disks is accommodated.

60 designates a cable engaging the grooved disks and extending from the front side of the left hand one to which it is rigidly attached at its end to the rear side of the right hand one. It engages the latter for approximately three-fourths of its circumference and terminates in a sleeve 61, having an upwardly projecting pin 62, which pin projects through the slot 63 of a cross bar 64, secured at its opposite side to the side walls of the casing in any suitable or preferred manner, said pin above the bracket having an enlargement or head 65, to hold it in the latter and in the path of an arm 66 carried by the baling plunger bracket. Said slot 63 is of such length that the movement of the pin therein from one end to the other results in rotating the disk about one hundred and eighty degrees or half a circle and terminates at each end in a rearwardly sloping portion 67 into which the pin enters under the pressure of said arm 66 in order that disengagement between them may take place and leave the arm free to pass the pin in its further travel.

Secured to the slotted cross bar 64, at the end of its slot nearest the baling case extension, is a spring 68, which intersects the sloping portion 67 of the slot rearward of the pin when engaging said portion, the function of said spring being to force said pin forwardly into the plane of the body of the slot after the arm 66, has automatically forced the pin therein and passed onward toward the baling case extension, it being understood that by reason of the retractive action of spring 68, said pin stands at the junction of the body of the slot and said sloping portion when struck by said arm. Upon the return of said arm after the compression stroke of the baling plunger has been made, it engages the opposite side of the pin and forces the same through slot 63, toward the opposite side of the casing, which action through the medium of cable 60 rotates the curved wheels and disks and therefore overcomes the resistance of springs 26 and effects through the medium of the pitmans the withdrawal or rearward stroke of the feed plunger. Just before the return stroke of the baling plunger is completed and at the end of the rear stroke of the feed plunger, arm 66 passes the pin by forcing it into the short sloping portion 67 of said slot, which action is instantly followed by the forward stroke of the feed plunger under the retractive action of said springs 26, as will be readily understood.

To guard against the possibility of straw getting into the baling case behind its plunger, I mount a spring roller 69, at the outer side of the box or casing and rearward of the baling case as shown in Fig. 2, said spring roller carrying a curtain 70, mounted thereon like a window shade on the usual spring roller, and having one end attached to the rear edge of said plunger, a suitable opening 71, in the box or casing being provided for the curtain to pass through, and the guide roller 72 in said opening to reduce friction as far as possible. This curtain unrolls against the resistance of its spring as the power stroke of said plunger takes place and automatically rewinds as said plunger movement is reversed. The construction of the curtain and its roller is not detailed as they may be of precisely the same construction and relation as an ordinary shade roller and shade.

To prevent an overcharge of straw to the baling case, I provide a reciprocatory apron 73, of substantially the same area and form as and fitting flatly against the underside of the top wall of the baling case and in the same horizontal plane as the upper portion of the feed plunger, said apron extending through a slot 74 in the front wall of the baling case and having forwardly projecting arms 75, underlying guide brackets 76 secured to the inner sides of the casing, said guide brackets in conjunction with the guide slot 74 maintaining the apron in the horizontal position described. The arms 75 are provided in their edges nearest the baling case extension with notches 77 and from said notches are beveled forward to their opposite edges as at 78.

Normally engaging the notches 77 are the upper ends of catches 79, pivoted to brackets 80, and having their lower ends pivotally connected by a link 81, spring 82 between one of the catches 79 and its bracket 80, serving to hold the former yieldingly in the path of the beveled ends 78 of the arms.

Projecting from the link and depending into the path of the baling plunger arm is a hook 83, adapted to be forced through slot 17 of casing 2, by the plunger arm 13, on its return stroke, to trip catches 79 from engagement with apron arms 75, to release the latter and permit it to be moved rearward as hereinafter explained. The mechanism for effecting such rearward movement is as follows:—Secured to the underside and rear end of arms 75 are cables 86, which extend forwardly a distance greater than the width of the apron and around guide pulleys 87, suitably supported from the baling case, the opposite ends of said cables being connected by retractile springs 88 extending forwardly below arms 75, and attached to pins 89 projecting inward from the sides of the casing 2, or the separator, if preferred. The hook 83 is disposed at such point on the link 81, that it is struck by the baling plunger arm on its return stroke just before the rearward movement of the feed plunger is ended, the result being the catches 79 are withdrawn from the notches 77 to permit the springs 88 to retract and incidentally slide the apron rearward so as to meet the feed plunger as the rear movement of the latter terminates. Instantly thereafter the feed plunger moves forward as hereinbefore explained so as to force the charge of straw into the baling case and at the same time force the apron forward to the position shown, the spring actuated catches 79 automatically reëngaging the notches and locking the apron in said position. The feed plunger as shown most clearly in Fig. 2, has its front wall corresponding in form to the curvature of the baling case and consequently when advanced it forms the rear wall of said case during the entire power or compression stroke of the baling plunger.

90 designates a stub shaft depending rigidly from the bottom of the baling case extension, and equipped with peripherally grooved pulleys 91 and 92, pulley 91 being embraced by a cable 93, secured rigidly to the pulley at one end as at 94 and connected at its opposite end by a retractile spring 95 to the outer end of said extension. Secured rigidly to said pulley 91 so as to rotate therewith is a double arm needle, the same comprising essentially the arm 96 projecting vertically upward at the rear side of the extension, the horizontal arms 97, projecting rigidly from vertical portion 96, and terminating in segmental arms or needles 98, of somewhat greater length than the width of the extension, said needles terminating in barbed ends 99, which are beveled upwardly from their points, and at their rear ends said barbs are preferably equipped with grooved rollers 100. Ordinarily the needles occupy the position shown in full lines Figs. 2 and 4, most clearly, the retractile spring 95, holding them in such position and returning them to such position after each needle operation as hereinafter explained, it being understood in this connection that in such operation the needles pass through the baling case extension in the plane of the longitudinal slots 10, thereof, and between the bale and the box or casing.

101 designates a cable attached at one end to pulley 92, and at the other to a fixed point, such as pin 102, carried by the box or casing. Intermediate of the fixed points it is guided around a pulley 103, journaled on a bracket 104, secured by preference to the thresher frame as shown most clearly in Fig. 3. It is also guided around a pulley 105 journaled on a pin 106, depending from the front portion of a jointed lever, said lever, consisting of a rear portion 107 pivoted for horizontal movement to a bracket 108, secured to cross bar 27, and a front portion 109 pivoted to the rear portion as at 110, for vertical movement. The spring 95 when holding the needles withdrawn as in Fig. 2, incidentally serves through the connections described to hold the jointed lever 107—109, in the position shown in Figs. 2 and 4. The front portion of said lever extends through the horizontal slot 111 of a suitable bracket 112, secured to the box or casing, which bracket extends concentrically of the pivot point of the jointed lever and is of substantially the proportion shown. The gravitative tendency of the front portion of the lever together with the downward pull thereon by cable 101, because engaging the pulley 105, at the lower side of the lever, tends to hold the front end of said lever portion depressed as shown in Figs. 3 and 8 most clearly. This depression of the front portion of said jointed lever is permitted because the lower wall of the slot 111, slopes downward as at 113, at the end contiguous to the baling case extension. In this connection it will be noticed by reference to Fig. 1, that the extreme front end of said lever portion when depressed, is below the plane of the heel 115, of the bracket arm 66, and by reference to Fig. 4, it will be seen that said lever portion, when in the position shown in full lines said figure, projects rearward of the path of movement of said heel 115, so that when raised to occupy a substantially horizontal position and the said baling plunger occupies the position shown by dotted lines, Fig. 4, the return of the latter to its position at the opposite end of the baling case will, through the instrumentality of its heel 115, swing the jointed lever from the position shown in full lines to the position shown in dotted lines Fig. 4. By the time said lever reaches said dotted position, it is withdrawn from the path of said heel 115, leaving the plunger arm free to continue its movement in the direction mentioned. Said lever in the movement, mentioned, through the medium of its pulley 105 and cable 101, rotates the needles from the position shown in full lines Figs. 2 and 4 and dotted lines Fig. 6, to the position shown in full lines in the last-named figure, when their barbs underride the wires hereinafter described, until such wires snap into the rollers 100, this action of the needles taking place as also shown in said last-named figure, while the bale is held from backward movement by the retainers 11, as hereinbefore explained. The instant this relation between the needles and the wires is established, which is at the same moment that the bracket heel 115, passes from engagement with the jointed lever, spring 95 retracts and withdraws the needles to the position shown in dotted lines Fig. 6 and draws the wires looped around the rollers 100, transversely through the baling case extension and against the rear end of the bale, see dotted lines.

116 designates the reels journaled upon a vertical shaft 117, carried by bracket 118, secured to the side of the threshing machine, the reel shaft having any suitable retarding means, to prevent it gaining momentum and paying out more than is required, the retarding means shown being a collar 118$^a$, on the shaft, and a spring brake 119, frictionally engaging said collar and secured rigidly to the bracket. From said reels the wires extend rearwardly and around the guide rollers 120, suitably supported from the box or casing contiguous to the inner end of the baling case extension, and in the plane of the slots 10 thereof. From said guide rollers the wires, in the initial part of the baling operation, extend diagonally through the slots 10 in the same horizontal plane and are secured to the upright portion 96, of the needle frame. As the bale begins to form from successive charges of straw forced into the extension, it comes against those portions of the wires extending through the baling case extension, after which each additional charge added to the bale effects the automatic paying out of wire from the reels. Eventually when the bale has attained its full length as indicated by the reference character 121, the wires will occupy substantially the positions shown in Fig. 6, that is to say, will extend from rollers 120, along the front side of the baling case extension, around the end of the bale and back to the upright portion of the needle frame.

The length of the bale is automatically determined by the following mechanism: 122 is a shaft journaled in bracket 123, carried by the baling case extension. Mounted rigidly on said shaft is a toothed wheel 124, projecting through the central slot or opening 125, in the front side of the extension and into the path of the bale so that as the latter moves outward while in course of formation, it rotates wheel 124, and therefore the shaft 122. The shaft carries a sprocket wheel 126 connected by chain 127 to an idler sprocket wheel 128, suitably supported, from the box or casing preferably, and movable with said sprocket 128 is a second sprocket wheel 129, connected by chain 130, with an idler sprocket wheel 131, journaled on the same stub shaft 104, that carries the idler roller 103. This chain is provided at a suitable point with a depending V-shaped tooth 132, which once in each complete travel of the chain engages the upper edge of a lever 133, suitably supported as at 134 from the box or casing, said lever projecting transversely inward and under the depressed end of the jointed lever. The proportion of the parts just described is such that the V-shaped tooth 132 engages the lever 133 at the termination of one of the power strokes of the baling plunger so that the operation of said lever by said tooth shall raise the depressed end of the jointed lever into the path of heel 115 as hereinbefore explained. As a result the first portion of the return movement of the baling plunger swings the jointed lever as hereinbefore explained and therefore causes the needles to pick up the baling wires and draw them transversely through the baling case extension rearward of the bale. Immediately after this takes place the attendant disengages the ends of the wire from the upright portion of the needle frame and then cuts the wire which is looped around the needle He then secures the first-named end of each wire strand to its opposite end so as to complete the formation of the bale, the ends of the reel wires being left free because the next charge of straw clamps them tightly against the bale just completed, the clamping action being sufficiently heavy to overcome the resistance of the reels and insure the paying out of wire therefrom as the formation of the bale progresses. Before the second bale attains its full length its front end has entered the contracted or tension portion of the extension and as a result the ends of the wires between such bale and the completed one in advance are clamped so tightly that they cannot slip when the needles again engage the wires and pull them tightly against and around the front side and rear end of said bale. In this connection it should be stated that the attendant has ample time to perform the operations just described because no further operation of the needles takes place until the wheel 124 has been rotated sufficiently to again effect the raising of the depressed end of the jointed lever through the instrumentalities described.

As the various operations have been described in detail it is thought that a recapitulation of the entire operation is unnecessary. It is to be understood of course that the invention is susceptible of modification in various particulars without departing from its spirit and scope or sacrificing any of its advantages.

Having thus described the invention what I claim as new and desire to secure by Letters Patent, is:—

1. The combination of a casing, a baling case therein and provided with a feed opening, a feed plunger opposite said feed opening, yielding means for causing the feed plunger to force material through the feed opening into the case, a baling plunger in the latter, means to operate the same while the feed plunger is advanced, and means for causing the return stroke of the baling plunger to withdraw the feed plunger.

2. The combination of a casing, a baling case therein and provided with a feed opening, a feed plunger opposite said feed opening, yielding means for causing the feed plunger to force material through the feed opening into the case, a baling plunger in the latter, means to operate the same while the feed plunger is advanced, and means for causing the return stroke of the baling plunger to withdraw the feed plunger, in combination with an apron in the plane of the upper edge of the feed opening and the feed plunger, and means for yieldingly pressing the apron against said feed plunger when the latter is withdrawn from the feed opening.

3. The combination of a casing, a baling case therein and provided with a feed opening, a feed plunger opposite said feed opening, yielding means for causing the feed plunger to force material through the feed opening into the case, a baling plunger in the latter, means to operate the same while the feed plunger is advanced, and means for causing the return stroke of the baling plunger to withdraw the feed plunger, in combination with an apron in the plane of the upper edge of the feed opening and the feed plunger, means for yieldingly pressing the apron against said feed plunger when the latter is withdrawn from the feed opening, and means for locking the apron forward of the feed plunger as advance movement of the latter ceases.

4. The combination of a casing, a baling case therein and provided with a feed opening, a feed plunger opposite said feed opening, yielding means for causing the feed plunger to force material through the feed opening into the case, a baling plunger in the latter, means to operate the same while the feed plunger is advanced, and means for causing the return stroke of the baling plunger to withdraw the feed plunger, in combination with an apron in the plane of the upper edge of the feed opening and the feed plunger, means for yieldingly pressing the apron against said feed plunger when the latter is withdrawn from the feed opening, means for locking the apron forward of the feed plunger as advance movement of the latter ceases, and means operated by the withdrawal stroke of the baling plunger for unlocking said apron.

5. The combination of a casing, a baling case within and at the bottom of the same and provided with a feed opening in its rear wall, a feed plunger rearward of the case, yielding means for causing the feed plunger to force material through said feed opening into the case and form a temporary rear wall for said opening, a baling plunger in the case, means to operate the same while the feed plunger is advanced, means for causing the return stroke of the baling plunger to withdraw the feed plunger, and means to free the feed plunger before the return stroke of the baling plunger is completed to permit the former to be yieldingly readvanced to force another charge of material into the baling case in advance of its plunger.

6. The combination of a casing having a baling case open at its rear side, an apron within and fitting against the upper wall of the baling case and projecting rearwardly therefrom, a feed plunger rearward of the case, means to yieldingly advance the same and force a charge of material into the case and the apron forwardly, means to lock the apron in its advanced position, a baling plunger, means to reciprocate said plunger means for causing the return stroke of said plunger to withdraw the feed plunger, means to release the apron and the feed plunger before the return stroke of the baling plunger is completed, and means to reproject the apron at approximately the same time as the feed plunger is released.

7. The combination of a casing having a baling case, open at its rear side, an apron within and fitting against the upper wall of the baling case and projecting rearwardly therefrom, a feed plunger rearward of the case, means to yieldingly advance the same and force a charge of material into the case, and the apron forwardly, means to lock the apron in its advanced position, a baling plunger, means to reciprocate said plunger, a spring roller suitably carried, a curtain thereon and attached at its outer end to the rear portion of the baling plunger, means for causing the return stroke of said last-named plunger to withdraw the feed plunger, means to release the apron and feed plunger before the return stroke of the baling plunger is completed, and means to reproject the apron at approximately the same time the feed plunger is released.

8. The combination with a machine having a rack, of a casing secured to said machine, a baling case within and extending across the bottom of said casing and below said rack and having its rear end open, a reciprocating plunger in the baling case, a feed plunger, means for advancing said feed plunger and forcing material in its path into the baling case in advance of the baling plunger, and holding said feed plunger advanced and forming the rear wall of the baling case while the power stroke of the baling plunger takes place, and means whereby the return stroke of the baling plunger effects the withdrawal of the feed plunger to permit a second charge of material to fall in front of it.

9. The combination with a machine having a rack, of a casing secured to said machine, a baling case within and extending across the bottom of said casing and below said rack and having its rear end open, a reciprocating plunger in the baling case, a feed plunger, means for advancing said feed plunger and forcing material in its path into the baling case in advance of the baling plunger and holding said feed plunger advanced and forming the rear wall of the baling case while the power stroke of the baling plunger takes place, means whereby the return stroke of the baling plunger effects the withdrawal of the feed plunger to permit a second charge of material to fall in front of it, and means to release the feed plunger from the baling plunger before the latter completes its return movement.

10. The combination with a machine having a rack, of a casing secured to said machine, a baling case within and extending transversely of and at the bottom of said casing and below said rack and provided with a feed opening at its rear side, a feed plunger, means for yieldingly advancing the same and forcing material in front of it upon the bottom of the casing into the baling case, an arm pivoted to the separator and extending through a longitudinal slot in the front wall of the baling case and equipped within the latter with a plunger, a cable extending through the casing and rigidly connected to said arm, means for alternately pulling on said cable in opposite directions so as to effect the power and return stroke of the baling plunger, means whereby said arm on its return stroke withdraws the feed plunger, and means for tripping the last-named means to release the feed plunger before the ensuing power stroke of the baling plunger.

11. The combination of a machine having a rack, of a casing secured to said machine, a baling case within and extending transversely of and at the bottom of said casing and below said rack and provided with a feed opening at its rear side, a feed plunger means for yieldingly advancing the same and forcing material in front of it upon the bottom of the casing into the baling case, an arm pivoted to the separator and extending through a longitudinal slot in the front wall of the baling case and equipped within the latter with a plunger, a cable extending through said casing and rigidly connected to said arm, rotary means attached to the cable to effect alternately the power and return stroke of the baling plunger, means whereby said arm on its return stroke withdraws the feed plunger, and means for tripping the last-named means to release the feed plunger before the ensuing power stroke of the baling plunger.

12. The combination of a machine having a rack, of a casing secured to said machine, a substantially horizontal baling case extending across the casing and below said rack and of curved form, a baling plunger therein, an arm secured rigidly to said plunger and pivoted to the separator at its opposite end, a cable attached to said arm, and rotary means for alternately pulling on said cable in opposite directions.

13. The combination of a machine having a rack, of a casing secured to said machine, a substantially horizontal baling case extending across the casing and below said rack and of curved form, a baling plunger therein, an arm secured rigidly to said plunger and pivoted to the separator at its opposite end, a cable attached to said arm, rotary means for alternately pulling on said cable in opposite directions, a swinging frame provided with a feed plunger, means for yieldingly operating said frame to cause said plunger to force material into the baling case, a pair of disks journaled to and below the casing, links uniting said disks to said frame, grooved wheels rotatable with said disks, a cable connecting said wheels and secured to one of them and provided with a pin at its opposite end, a frame having a slot engaging said pin and terminating in sloping ends, a spring bridging one of said sloping ends of the slot and holding said pin in the plane of the body of the slot when the feed plunger is advanced, and an arm projecting from the pivoted arm on the power stroke of the baling plunger to force said pin out of its path into the registering sloping portion and on the return stroke of said plunger to move said pin through the body portion of the slot to withdraw the feed plunger and into the other sloping portion of the slot to release the feed plunger.

14. The combination of a machine having a rack, of a casing secured to said machine, a substantially horizontal baling case extending across the casing and below said rack and of curved form, a baling plunger therein, an arm secured rigidly to said plunger and pivoted to the separator at its opposite end, a cable attached to said arm, rotary means for alternately pulling on said cable in opposite directions, a swinging frame provided with a feed plunger, means for yieldingly operating said frame to cause said plunger to force material into the baling case, a pair of disks journaled to and below the casing, links uniting said disks to said frame, grooved wheels rotatable with said disks, a cable connecting said wheels and secured to one of them and provided with a pin at its opposite end, a frame having a slot engaging said pin and terminating in sloping ends, a spring bridging one of said sloping ends of the slot and holding said pin in the plane of the body of the slot when the feed plunger is advanced, an arm projecting from the pivoted arm and adapted on the power stroke of the baling plunger to force said pin out of its path into the registering sloping portion and on the return stroke of said plunger to move said pin through the body portion of the slot to withdraw the feed plunger and into the other sloping portion of the slot to release the feed plunger, a slidable apron within and against the upper wall of the baling case and thrown into the vertical plane of the latter by the advance of the feed plunger, means whereby said apron is unlocked through the instrumentality of the pivoted arm on the return stroke of the baling plunger, and means for yieldingly projecting said apron beyond the rear side of the baling case when unlocked.

15. The combination of a machine having a rack, of a casing secured to said machine, a baling case within and extending transversely of and at the bottom of the casing, an extension for the baling case having spring retainers and horizontal slots in its side walls, a yieldingly retracted frame at the rear side of the baling case extension and provided with needles to swing through said slots between the retainers and the baling case, and provided with barbed ends, reels suitably mounted and having their wires extending transversely through the baling case extension slots into the path of said needles, a plunger, and means for causing the same on its power stroke to force baling material from the baling case into the extension beyond said retainers against said intersecting wires.

16. The combination of a machine having a rack, of a casing secured to said machine, a baling case within and extending transversely of and at the bottom of the casing and below said rack, an extension for the baling case having spring retainers and horizontal slots in its side walls, a yieldingly retracted frame at the rear side of the baling case extension and provided with needles to swing through said slots between the retainers and the baling case and provided with barbed ends, reels suitably mounted and having their wires extending transversely through the baling case extension slots into the path of said needles, a plunger, means for causing the same on its power stroke to force baling material from the baling case into the extension beyond said retainers against said transverse wires, a friction wheel suitably journaled on the baling case extension and projecting therein to be turned by the engagement therewith of the bale in process of formation, a lever suitably mounted, a connection between said lever and said swinging frame, and means actuated through the instrumentality of said wheel to cause the baling plunger arm to operate said lever and release it at the end of such operation, said operation causing the needles to swing across through the baling case extension between the retainers and the baling case and snap into engagement with the wires contiguous to the rear end of the bale.

17. The combination with a suitable support, of a casing, a baling case extending transversely through said casing, means to introduce material to be baled within said baling case, a baling plunger to force such material through said case, a baling case extension at one side of the casing and having one end registering with the discharge end of the baling case, and means whereby said extension may be folded up against the casing and out of alinement with the baling case.

18. The combination with a suitable support, of a casing, a baling case extending transversely through said casing, means to introduce material to be baled within said baling case, a baling plunger to force such material through said case, a baling case extension at one side of the casing and having one end registering with the discharge end of the baling case, means whereby said extension may be folded up against the casing and out of alinement with the baling case, and means for securing said extension in its folded position.

19. The combination of a suitable support; a baling case carried thereby provided with a slotted extension; wire-carrying reels suitably supported and needles at opposite sides of the extension, said needles having bevel-ended hooks to engage the baling wires; wire guides between the reels and needles to hold the wires engaging the baling material in the extension transversely and in the plane of movement of the hook ends of the needles, and means to cause said needles to move transversely through the slotted extension behind the baling material therein and engage the wires between the guides and the baling material and withdraw with said wires to their original positions so as to dispose the portions of the wires extending from the baling material to the needles across the rear end of the former.

20. The combination of a suitable support; a baling case carried thereby provided with a slotted extension; wire-carrying reels suitably supported and needles at opposite sides of the extension, said needles having bevel-ended hooks to engage the baling wires; wire guides between the reels and needles to hold the wires engaging the baling material in the extension transversely and in the plane of movement of the hook ends of the needles; a wheel rotated by the movement of the bale; and means controlled by the movement of said wheel, to permit of the operation of the needles.

21. The combination of a baling case, a slotted extension therefor, a yieldingly-retracted swing frame provided with needles to pass through the slots of the extension, a lever suitably supported, a connection between the lever and needle frame to insure synchronous movement, a plunger to force baling material in to the extension, a swing arm for the plunger, and means whereby the back stroke of said arm shall operate said lever and swing the needles through the slotted extension.

22. The combination of a baling case, a slotted extension therefor, a yieldingly-retracted swing frame provided with needles to pass through the slots of the extension, a lever suitably supported, a connection between the lever and needle frame to insure synchronous movement, a plunger to force baling material into the extension, a swing arm for the plunger, means whereby the back stroke of said arm shall operate said lever and swing the needles through the slotted extension, and means to trip said lever from engagement with the plunger arm to permit the needles and said lever to be returned to their original position.

23. The combination of a baling case, a plunger therein having an arm, a slotted extension for the case, a swing frame having needles to pass through the extension, a lever having vertical and lateral movement, a friction disk to be rotated by the movement of the baling material in the extension, a second lever, means actuated by said friction disk for causing the second lever to vertically move the first lever into the path of the plunger arm when the latter is at the end of one of its compression strokes, and means for tripping said second lever out of the path of the plunger arm on but before its return movement or stroke is completed.

24. The combination of a baling case, a plunger therein having an arm, a slotted extension for the case, a swing frame having needles to pass through the extension, a lever having vertical and lateral movement, a friction disk to be rotated by the movement of the baling material in the extension, a second lever, means actuated by said friction disk for causing the second lever to vertically move the first lever into the path of the plunger arm when the latter is at the end of one of its compression strokes, means for tripping said second lever out of the path of the plunger arm on but before its return movement or stroke is completed, and means for returning the needle frame and first-named lever to their original positions after the latter is tripped.

25. The combination of a suitable support, a baling case carried thereby provided with a slotted extension, a plunger to travel in the baling case and part way in the extension thereof, wire carrying reels suitably supported at one side and needles at the opposite side of the extension said needles having bevel-ended hooks to engage the baling wires, wire guides between the reels and extension to hold the wires engaging the baling material in the baling extension transversely and in the plane of movement of the hook ends of the needles, movable means connected to cause the needles to move transversely through the slotted extension behind the baling material therein, a wheel rotated by the movement of the bale, to cause said movable means connected to the needles to be actuated by the return stroke of the plunger, means to trip said movable means from such relation with the plunger after the hook ends of the needles are engaged with that portion of the wires extending from the guides to the material in the baling extension, and means to withdraw said needles with said portions of the wires, to their original positions after such tripping action occurs.

In testimony whereof I affix my signature, in the presence of two witnesses.

ROBERT C. REDPATH.

Witnesses:
    FRED V. GRIFFITH,
    G. Y. THORPE.